Oct. 28, 1941.     W. C. GROENIGER     2,260,616
TRAP DEVICE FOR TRAPPING WASTE OUTLETS
Filed Sept. 27, 1939     2 Sheets-Sheet 1

INVENTOR
William C. Groeniger
BY
Henry J. Lucke
HIS ATTORNEY

Oct. 28, 1941.   W. C. GROENIGER   2,260,616
TRAP DEVICE FOR TRAPPING WASTE OUTLETS
Filed Sept. 27, 1939   2 Sheets-Sheet 2
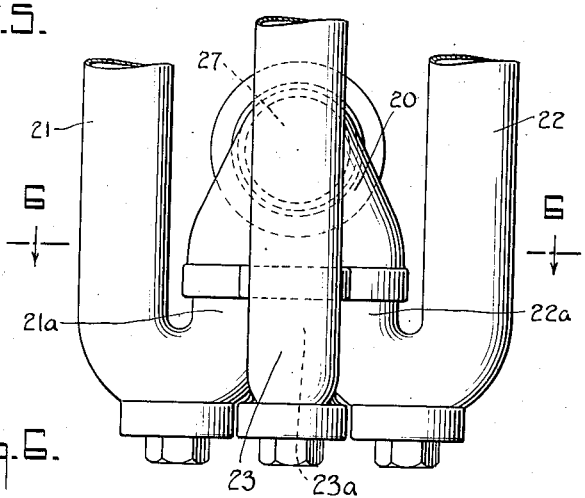
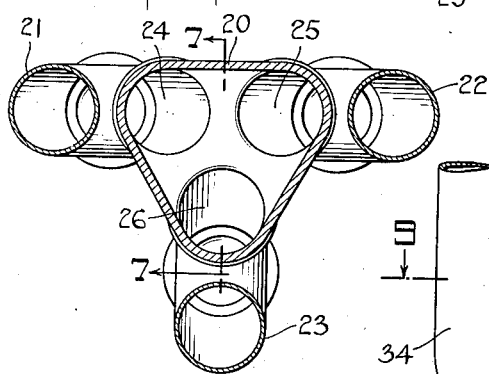
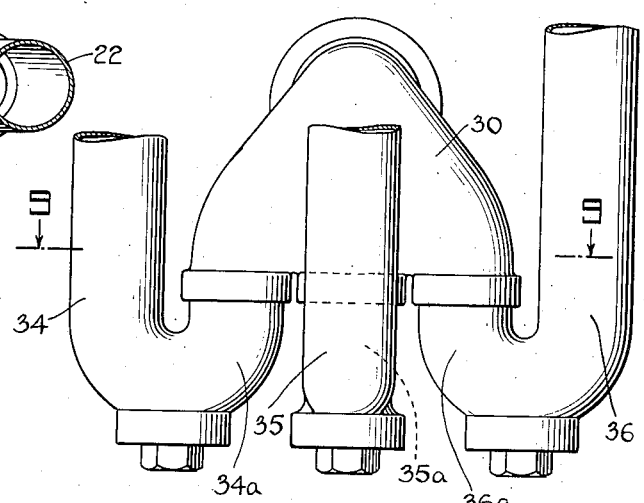
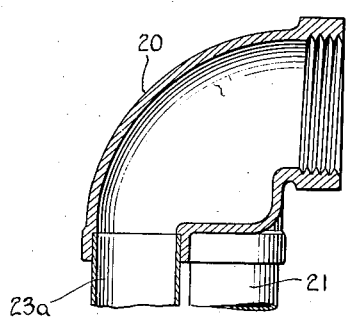
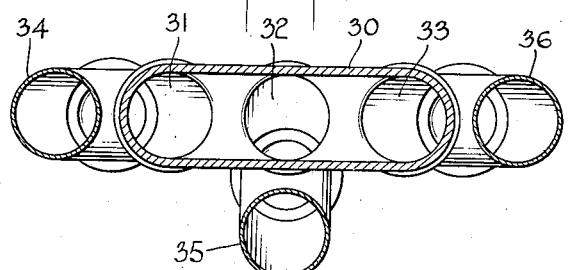
INVENTOR
William C. Groeniger
BY
Henry J. Lucke
HIS ATTORNEY Patented Oct. 28, 1941

2,260,616

UNITED STATES PATENT OFFICE 2,260,616

TRAP DEVICE FOR TRAPPING WASTE OUTLETS

William C. Groeniger, Columbus, Ohio, assignor to John B. Pierce Foundation, New York, N. Y., a corporation of New York Application September 27, 1939, Serial No. 296,774

5 Claims. (Cl. 182—18)

This invention relates to fixture trap devices useful in the plumbing art for stopping return flow of noxious gases from waste outlets, and in particular to fixture trap devices for trapping a plurality of waste outlets, in common, with respect to a single soil or other waste discharge pipe.

When several waste outlets are trapped in common with respect to soil, or other waste piping, it is customary practice to run the waste outlet piping into the trap device above the trap seal whereby free passage is afforded between the several waste outlets, one with the other or others, even though each is trapped relative to the soil or other waste piping. Such practice leads to air circulation through the freely interconnected waste outlets when the piping is heated, and to a consequent malodorous discharge of air from the waste drains of the plumbing fixtures when the piping has accumulated an internal coating of waste matter.

Further, it is customary practice to so connect the waste outlet piping with the trap device as to direct flow therefrom at a relatively great angle to the general flow through the trap device, thus impeding, to a considerable extent, flow into and out of the trap device.

An object of the present invention, therefore, is to provide a trap device capable of trapping, in common, with respect to waste or soil piping, a plurality of waste outlets, and to, at the same time, trap the individual waste outlets, one with respect to the other or others.

An object is to provide a trap device which will unite the fluid streams flowing from the plurality of waste outlets while such streams are flowing in substantially the same direction substantially without flow restriction.

An object is to provide a novel type of pipe fitting for association with the piping or with other pipe fittings in the formation of a trap device in accordance with the invention.

An outstanding feature of the invention is the provision, in a trap device, of a plurality of down legs disposed in substantially parallel side-by-side relationship, each having a curved lower end which intersects the lower end of a single up leg, common to all, to form therewith a return bend trapway. Accordingly, each of the down legs cooperates with the single up leg to provide a trapway which serves to trap a waste outlet with respect to soil or waste piping, as well as with respect to other waste outlets utilizing the same trap device.

Further features and objects of the invention will be apparent from the following detailed description.

In the drawings:

Fig. 5 represents a front elevation of another embodiment of trap device pursuant to the present invention.

Fig. 6 represents a horizontal section taken on the line 6—6, Fig. 5.

Fig. 7 represents a vertical section taken on the line 7—7, Fig. 6.

Fig. 8 represents a front elevation of still another embodiment of trap device pursuant to the invention.

Fig. 9 represents a horizontal section taken on the line 9—9, Fig. 8.

The fixture trap device, illustrated in Figs. 1 through 4 of the drawings, comprises an up leg fitting indicated generally by the numeral 10, and individual down leg fittings, indicated generally by the numerals 11 and 12, respectively, and represents one embodiment of the present invention.

Figure 3:
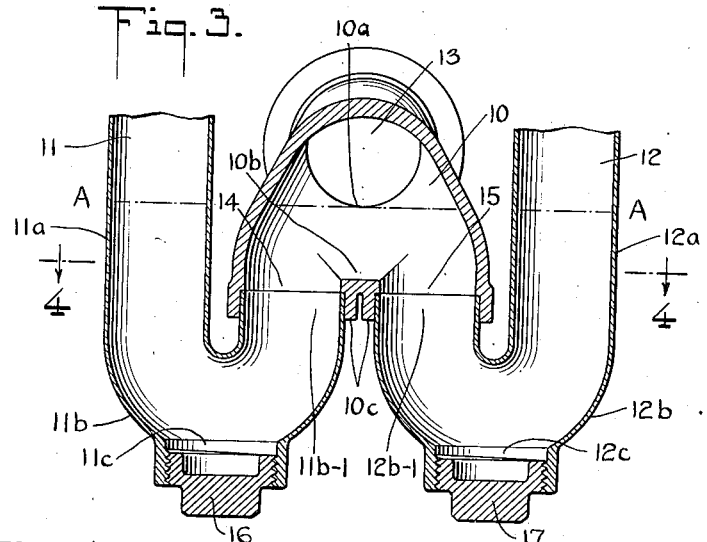
Fig. 3 represents a vertical section taken on the line 3—3, Fig. 2.
Figure 4:
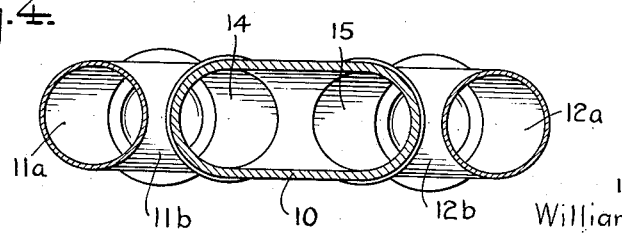
Fig. 4 represents a horizontal section taken on the line 4—4, Fig. 3.

The up leg fitting 10 has its upper end portion elbowed to form the crown weir 10a of the trap, see Fig. 3, and has formed thereat an outflow opening 13. The walls which define the outflow opening 13 are formed to receive outflow piping 14 in a sweated or otherwise water-tight joinder of a type conventional in the plumbing art. The body portion of the up leg 10 diverges downwardly to a lower end portion 10b which has a plurality of bottom inflow openings, indicated 14 and 15, Figs. 3 and 4. The walls 10c, 10c, which define the inflow openings 14 and 15, respectively, are formed to receive connecting ends of the down legs 11 and 12, respectively, in a sweated or otherwise water-tight joinder conventional in the plumbing art.

It should be noted that inflow openings 14 and 15 lie side by side, in the preferably single plane of the bottom of the lower end portion 10b of the up leg fitting 10, and that the inflow passages formed thereby are substantially parallel and directed in substantially the same directions upwardly toward the outflow opening 13. The walls of the body portion of up leg 10 curve to provide relatively smooth passage through the fitting.

The down legs 11 and 12, as illustrated, comprise down legs proper 11a and 12a, respectively, and, at the lower ends of the latter, bend portions 11b and 12b respectively. The bend portions 11b and 12b, are of substantially U-bend formation having short legs 11b—1 and 12b—1, respectively, and thus form return bend portions of the completed trap. Clean out openings 11c and 12c, respectively, may be provided in the bottom walls of the return bend portions 11b and 12b, respectively, and the walls defining the same may be internally threaded for receiving the externally threaded clean out plugs 16 and 17, respectively.

Figure 1:
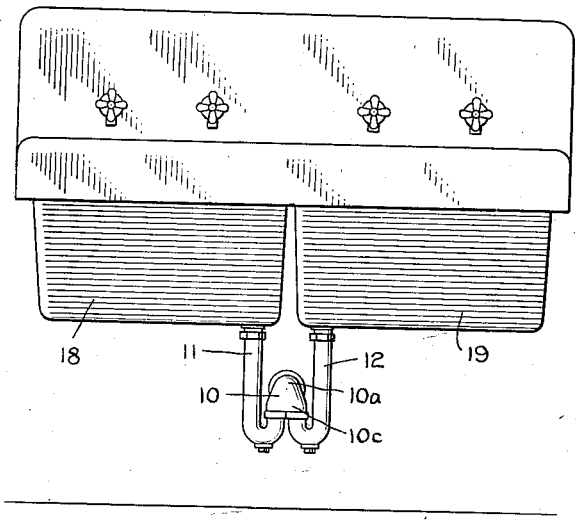
Fig. 1 represents a front elevation of two laundry trays trapped in common by a preferred form of the present invention, the trap device being also illustrated in front elevation.
Figure 2:
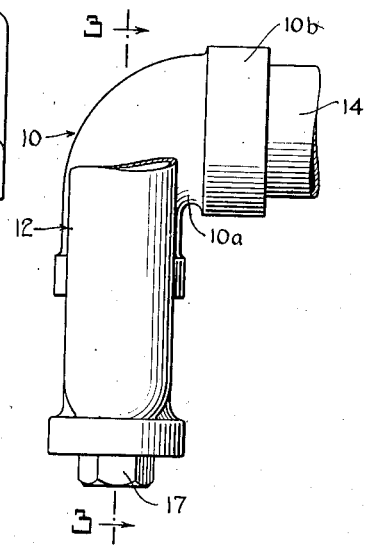
Fig. 2 represents a left side elevation of the trap device of Fig. 1, enlarged.

As will be noted in Fig. 1, the down legs 11 and 12 connect in customary manner with the waste outlets of the laundry trays 18 and 19, respectively. Accordingly, the two laundry trays 18 and 19 are trapped relative to each other, and, individually, relative to the waste piping 14, it being understood that the upper limit of the trap seal is established at the level of the crown weir 10a, see the dotted line A—A, Fig. 3.

Considered as a unit, the lower, i. e. U-bend, portion of each of the individual down legs 11 and 12 combines with a respective individual lower portion, i. e. bottom opening portion 14 or 15, of the single up leg 10 to form individual return bend portions of the trap device.

By reason of the placement and formation of the inflow openings 14 and 15 in the lower end of up leg 10, and, also, of the formation of the lower ends of the respective down legs 11 and 12, waste liquid flowing through the trap device from the plurality of plumbing fixtures will unite along substantially straight angles while flowing in substantially the same direction.

In most instances, it is advisable to provide the outflow opening 13 of greater cross sectional area than that of the individual inflow opening 14 or 15, for accommodating simultaneous flow through the plurality of down legs.

In the above described embodiment, provision is made for trapping two waste outlets, the two down leg fittings 11 and 12 running substantially parallel at opposite lateral sides of the single up leg fitting 10. Obviously, as convenience dictates, the down leg fittings 11 and 12 may be placed relative to each other and to the single up leg fitting 10 at any non-interfering locations within the ranges of rotation of the down legs proper 11a and 12a, about the inflow openings 14 and 15, respectively, as centers.

As illustrated in Figs. 5 through 9, the fixture trap device of the invention may be adapted to trap a greater number than two waste outlets, without sacrificing the advantageous features of the invention.

Figs. 5, 6 and 7 illustrate a construction of the single up leg fitting, here indicated 20, which is adapted to receive three short leg fittings, here indicated 21, 22, and 23, similar to those of the prior figures. The bottom of the single up leg fitting 20 is of triangular configuration, see Fig. 6, and is provided, at the three vertices thereof, with the inflow openings 24, 25, and 26, respectively. The fitting 20 diverges downwardly in an appropriate manner from the upper lateral outflow opening, indicated generally at 27, Fig. 5, the walls of the fitting being suitably curved to reduce restriction to flow to a minimum.

As is true in the embodiment of Figs. 1 through 4 the inflow openings 24, 25, and 26 preferably lie in the single plane of the bottom of up leg fitting 20, and the short legs 21a, 22a, and 23a of the U-bend formations at the lower end of the down leg fittings 21, 22, 23 are substantially parallel for the purpose of uniting the fluid flows within the single up leg fitting 20 while such fluid flows are flowing in substantially the same direction.

For certain installations it may be desirable to provide the trap device of Figs. 1 through 4 for the trapping of more than two waste outlets without disturbing the primary structural characteristics peculiar to that embodiment.

In Figs. 8 and 9 is illustrated a trap device having an up leg fitting 30 similar in design to the up leg fitting 10 of the embodiment illustrated in Figs. 1 through 4, but elongated laterally to accommodate three openings, indicated 31, 32, and 33, respectively, Fig. 9, in substantially rectilinear alignment along the width of the fitting.

Down leg fittings 34, 35, and 36, similar to the above described down leg fittings, have the short legs 34a, 35a, and 36a of their respective U-bend portions connected with the inflow openings 31, 32, and 33, respectively. The short legs 34a, 35a, and 36a are substantially parallel, as is the case in the prior embodiments, and accordingly, provide for the uniting of the fluid streams from same along substantially straight angles and in substantially the same direction within the single up leg 30. The lateral out flow opening from up leg 30 is arranged and directed as are those similar out flow openings of the prior embodiments.

Obviously, more than three inflow openings may be provided in the bottom wall of either up leg 20 or up leg 30, and a correspondingly increased number of down legs provided, if it should be found desirable to do so, by simply enlarging the lower part of the up leg in a suitable manner.

In all embodiments of the invention the primary concern is the uniting of a plurality of streams from waste outlets substantially without restriction to flow. This is accomplished most effectively by conducting the streams to a common meeting place without restricting the passages through which the streams flow into the common meeting place, and while such streams are flowing in substantially parallel relationship in substantially the same direction. The illustrated and described embodiments are merely examples of satisfactory constructions. Many structural changes may be made without departing from the generic scope and spirit of the invention set forth herein and in the following claims.

I claim:

1. A fixture trap device comprising a plurality of individual down legs having curved lower ends, respectively, and a single up leg having a substantial horizontal bottom wall through which a plurality of individual openings are formed, the respective lower ends of said plurality of down legs being connected with the respective openings of said plurality of openings in the said bottom wall to form return bend portions of said trap device.

2. A fixture trap device comprising a plurality of individual down legs, a single up leg, and individual bend portions respectively connecting the respective down legs with the said up leg, said down legs and said up leg being substantially parallel and extending substantially vertically, providing for the uniting of the individual flows therethrough along substantially straight angles.

3. A fixture trap device comprising a plurality of down legs having lower ends, respectively, of substantially U-bend formation, and a single up leg having a plurality of bottom openings, the respective short legs of said U-bend formations being connected with the respective openings of said plurality of bottom openings in said up leg to form return bend portions of said trap device.

4. A fixture trap device comprising a plurality of individual down legs having curved lower ends, respectively, and a single up leg having a plurality of individual openings formed in its lower end, the respective lower ends of said plurality of down legs being connected with the respective openings of said plurality of openings in the lower end of said up leg to form return bend portions of said trap device, said individual openings lying in a common plane and said down legs and said up leg being substantially parallel, providing for the uniting of the individual flows therethrough along substantially straight angles.

5. A fixture trap device comprising a plurality of down legs having lower ends, respectively, of substantially U-bend formation, and a single up leg having a plurality of bottom openings, the respective short legs of said U-bend formation being connected with the respective openings of said plurality of bottom openings in said up leg to form return bend portions of said trap device, said bottom openings lying in substantially a common plane and said down legs and said up leg being substantially parallel, providing for the uniting of the individual flows therethrough along substantially straight angles.

WILLIAM C. GROENIGER.